United States Patent [19]
Fredlund et al.

[11] Patent Number: 5,838,464
[45] Date of Patent: Nov. 17, 1998

[54] SYSTEM AND METHOD FOR SCANNING IMAGES CONTAINED ON A STRIP OF PHOTOSENSITIVE FILM

[75] Inventors: John Randall Fredlund; Joseph Anthony Manico; Frank Pincelli, all of Rochester, N.Y.

[73] Assignee: Eastman Kodak Company, Rochester, N.Y.

[21] Appl. No.: 651,423

[22] Filed: May 22, 1996

Related U.S. Application Data

[60] Provisional application No. 60/006,149, Nov. 2, 1995.
[51] Int. Cl.$^6$ ...................................................... H04N 1/04
[52] U.S. Cl. ........................................... 358/498; 355/235
[58] Field of Search ................................... 358/487, 474, 358/486, 488, 496, 498, 506; 355/233, 234, 235; 348/97

[56] References Cited

U.S. PATENT DOCUMENTS

| | | | |
|---|---|---|---|
| 4,656,525 | 4/1987 | Norris | 358/487 |
| 4,816,903 | 3/1989 | Utsuda | 358/487 |
| 5,061,955 | 10/1991 | Watanabe | 355/45 |
| 5,093,734 | 3/1992 | Gerlach | 358/474 |
| 5,097,292 | 3/1992 | Hicks | 355/38 |
| 5,113,268 | 5/1992 | Yoshida et al. | 358/474 |
| 5,258,859 | 11/1993 | Wada et al. | 358/487 |
| 5,280,860 | 1/1994 | Kataoka | 242/71.1 |
| 5,333,033 | 7/1994 | Blackman | 355/27 |
| 5,381,245 | 1/1995 | Johnston et al. | 358/487 |
| 5,477,343 | 12/1995 | Nodelman et al. | 358/487 |
| 5,506,695 | 4/1996 | North | 358/474 |

FOREIGN PATENT DOCUMENTS 2 148 658   5/1985   United Kingdom ............. H04N 1/10

*Primary Examiner*—Thomas D. Lee
*Assistant Examiner*—Jerome Grant, II
*Attorney, Agent, or Firm*—Frank Pincelli; David A. Novais

[57] ABSTRACT

A method and system for scanning images contained on a strip of film. The system includes a film cartridge having a spool rotatably mounted thereto. The cartridge includes a filmstrip spirally wrapped about the spool and an opening for allowing film to be taken out of said cartridge. The system includes a scanner having a platen designed to receive an item for scanning and digitizing the information scanned. A transport mechanism is provided which includes a housing for retaining a film cartridge and a guide for guiding the filmstrip onto the platen. A drive mechanism is provided in the transport mechanism for advancing film out of the cartridge and onto the platen for scanning. The scanner scans the filmstrip and digitizing information contained therein.

20 Claims, 5 Drawing Sheets

SYSTEM AND METHOD FOR SCANNING IMAGES CONTAINED ON A STRIP OF PHOTOSENSITIVE FILM

CROSS REFERENCE TO RELATED APPLICATION

Reference is made to and priority claimed from U.S. Provisional Application U.S. Ser. No. 60/006,149, filed 02 Nov. 1995, entitled SYSTEM AND METHOD FOR SCANNING IMAGES CONTAINED ON A STRIP OF PHOTOSENSITIVE FILM.

FIELD OF THE INVENTION

It is known in the art to provide digital scanners for scanning an image placed on the scanner and converting the information to a digital signal. An example of such a scanner is the Hewlett Packard ScanJet IICS scanner. It is also known to provide such scanners with an optional transparent adapter so that the scanner can scan transparencies such as negative or positive film. It has been suggested in U.S. Ser. No. 08/203,149, filed Feb. 28, 1994, entitled METHOD OF MAKING AN INDEX PRINT, by Joseph A. Manico, David L. Patton, Thomas R. Roule, John R. Fredlund, and Anthony R. Berardi, which is also assigned to the assignee of the subject application, to scan a plurality of cut individual filmstrips and converting this information to an index print. While the subject application provides an easy method for converting negatives to an index print, it does so by the placement of cut individual strips individually on the platen. A disadvantage with such a device is that it cannot easily accommodate strips of photographic film longer than the platen or attached to a film cartridge. Another disadvantage is that the subject application requires substantial manual manipulation of the cut strips of film having the images to be scanned.

Applicants have invented a system and method for automatically scanning negative film that is contained in continuous rolls of film which is easy to use and can be adapted to a variety of scanners.

SUMMARY OF THE INVENTION

In one aspect of the present invention a system is provided for scanning images contained on a strip of film. The system includes a film cartridge having a spool rotatably mounted thereto. The cartridge includes a filmstrip spirally wrapped about the spool and an opening for allowing film to be taken out of said cartridge. The system includes a scanner having a platen designed to receive an item for scanning and digitizing the information scanned. A transport mechanism is provided which includes a housing for retaining a film cartridge and a guide for guiding the filmstrip onto the platen. A drive mechanism is provided in the transport mechanism for advancing film out of the cartridge and onto the platen for scanning. The scanner scans the filmstrip and digitizing information contained therein.

In another aspect of the present invention there is provided a method for automatically scanning a filmstrip having at least one image. The method utilizes a digital scanner having a platen for allowing scanning of the at least one image and providing a digital output representative of the at least one image scanned. The method comprises the steps of:

a) advancing a predetermined amount of the filmstrip onto the platen;

b) scanning the predetermined amount of filmstrip;

c) advancing an additional predetermined amount of filmstrip onto the platen;

d) scanning the additional predetermined amount of filmstrip; and e) repeating steps c) and d) until the entire filmstrip has been scanned.

In yet another aspect of the present invention there is provided a method of automatically scanning a filmstrip having at least one image thereon, utilizing a scanner having a platen for allowing the scanning of an item, and providing a digital output representative of at least one image so scanned. The method comprising the steps of:

a) providing an adapter for retaining a filmstrip, said adapter having means for moving the filmstrip across said platen;

b) moving said filmstrip continuously across said platen; and c) scanning said filmstrip as it moves across said platen so as to obtain a digital record of all the images thereon.

DETAILED DESCRIPTION OF THE PREFERRED EMBODIMENTS

Figure 1:
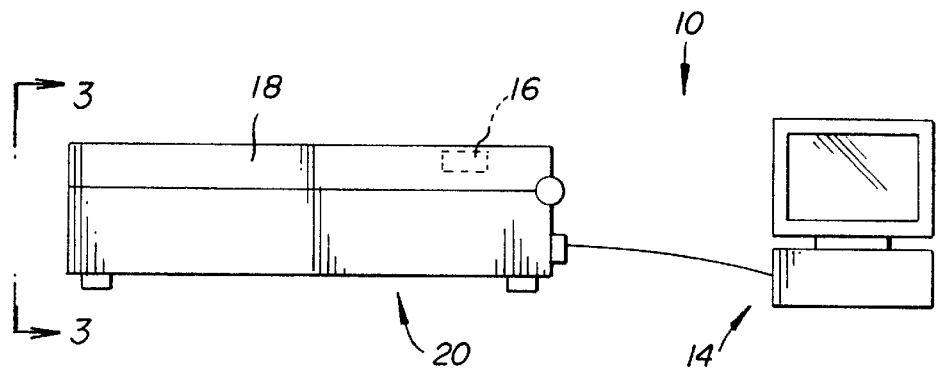
FIG. 1 is a schematic illustration of a prior art page scanner and post computer.
Figure 2:
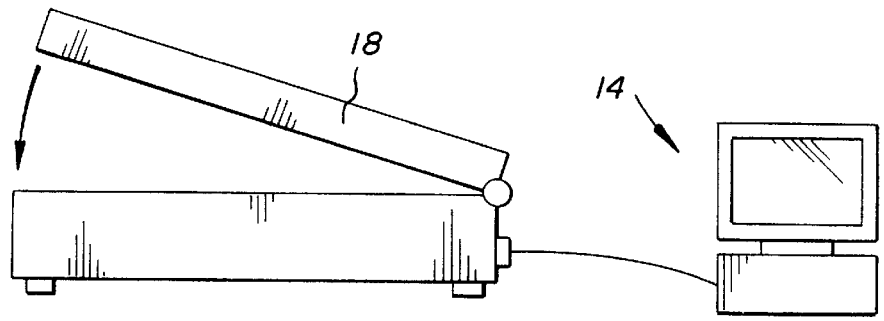
FIG. 2 is a view similar to FIG. 1 illustrating the cover of the scanner in the open position.
Figure 3:
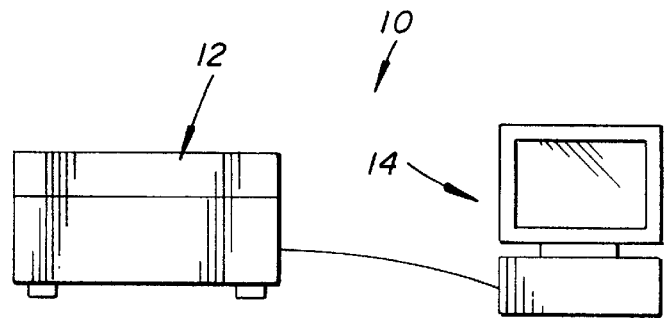
FIG. 3 is a side elevational view of the scanner of FIG. 1 as taken along line 3—3.

Referring to FIGS. 1–3, there is illustrated a digital page scanning system 10 which comprises a scanner 12 which is controlled and operated by computer 14 such as a personal computer that is readily available on the market. In the particular embodiment illustrated, the digital page scanner 12 is a Hewlett Packard ScanJet IICX, which is equipped with an optional transparency illuminator C2501A. The scanner 12 is designed to scan documents such as photographs, graphic, or any type of flat reflective material, or if an optional transparency illuminator is provided, to scan transparent art forms with a light source. In the particular embodiment illustrated, light source 16 is provided in the cover 18. The optional transparency illuminator allows the scanning of various transparent media which includes film negatives, film positives (slides), overhead transparencies, etc. The optional transparency adapter may not be required if the scanner provides its own light source.

Referring to FIG. 2, scanner 12 is illustrated with the cover in the open position which allows the material to be placed on the scanner platen 20 for scanning of the material.

Figure 4:
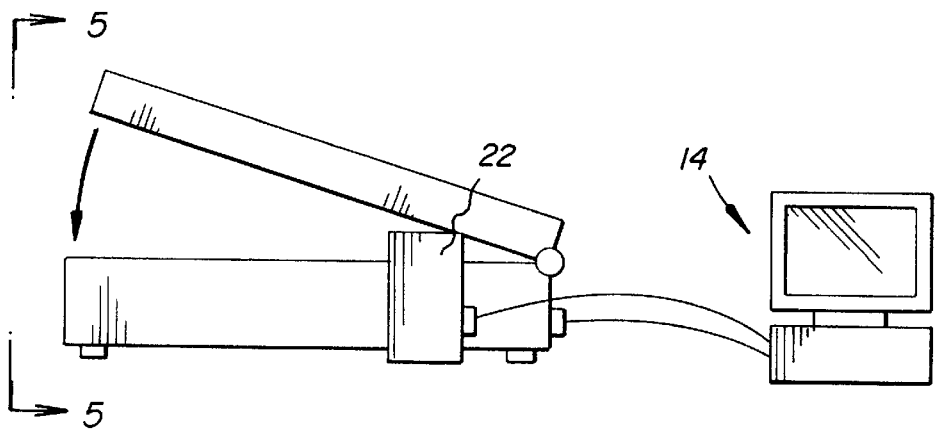
FIG. 4 is a view similar to FIG. 2 illustrating a page scanner adapter made in accordance with the present invention mounted on the scanner.
Figure 5:
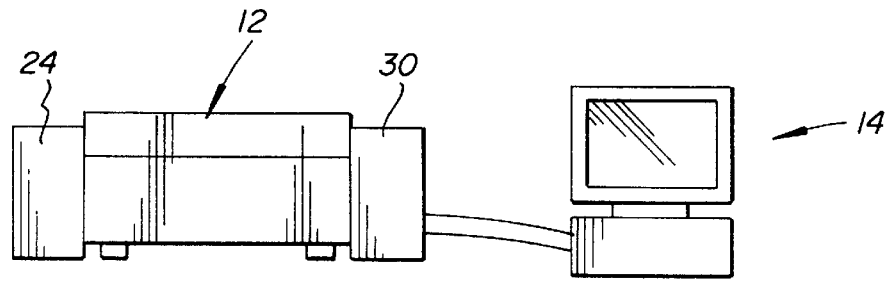
FIG. 5 is an elevational view of the scanner of FIG. 4 as taken along line 5—5 with the cover in the closed position.
Figure 6:
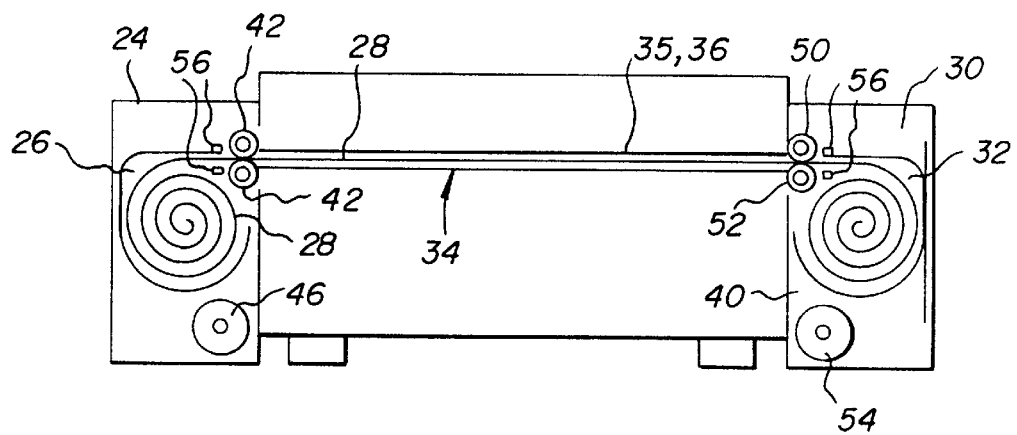
FIG. 6 is an enlarged cross-sectional view of the scanner and page scanner adapter installed thereon.
Figure 7:
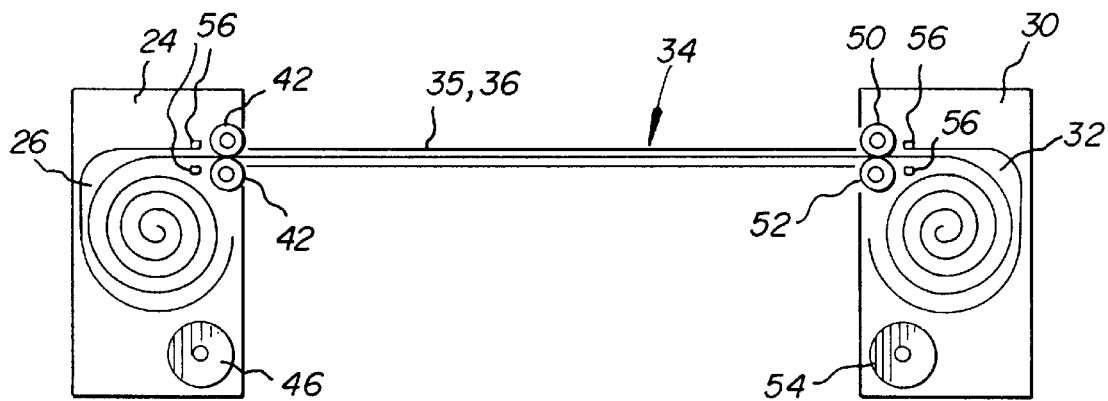
FIG. 7 is a view similar to FIG. 5 with the scanner removed.

Referring to FIGS. 4, 5, and 6, there is illustrated the digital page scanning system 10 which has an automatic film transport adapter 22 made in accordance with the present invention. The automatic film transport adapter 22 includes a film supply housing 24 which includes a chamber 26 designed to retain a strip of developed photographic film 28. As can be seen by reference to FIG. 6, the strip of photographic film 28 is spirally wrapped within chamber 26. The automatic film transport adapter 22 also includes a film take-up housing 30 having an internal chamber 32 for temporarily receiving and storing film that has been supplied by the film supply housing 24. Connecting the film supply housing 24 and film take-up housing 30 is a guide assembly 34 for guiding of the film from the supply housing 24 to the film take-up housing 30. The guide assembly 34 assists in maintaining the filmstrip 28 flat against the scanner platen. In the particular embodiment illustrated, guide assembly 34 comprises of a pair of parallel tracks 35,36, each designed to receive one of the edges of the strip of photographic film 28. The tracks 35,36 each have a generally U-shaped configuration with the opening facing and receiving the edge of the film.

The tracks 35,36 are either permanently secured to the housings 24,30, or are designed for easy connecting and disconnecting for assembling on the scanner 12. In the particular embodiment illustrated, the tracks 35,36 are secured to the housings 24,30 such that the automatic film transport system can be moved as a unit. The length of the tracks 35,36 are designed such that the housings 24,30 are disposed adjacent the sides 38,40 of the base 19 of scanner 12. In the embodiment illustrated, a pair of drive pinch rollers 42,44 are provided for driving of the filmstrip 28 from film supply housing 24 to film take-up housing 30 and then returning the film back to the supply housing 24. A motor 46 is connected to one of the pinch rollers 42,44 by appropriate means (not shown) so as to rotate the pinch rollers in an appropriate direction for either driving the filmstrip 28 out of, or back into, the supply housing 24. For example, an appropriate drive belt (not shown) may be provided between motor 46 and one of the pinch rollers 42,44. In a similar manner, the take-up housing 30 may also be provided with a pair of drive pinch rollers 50,52 which are appropriately connected to a motor 54. The motors 46,54 are connected to CPU 14 such that CPU 14 can control the operation of the motors 46,54 so that the filmstrip 28 will be moved out of, or back into, the housing. The housings 24,30 are each provided with a pair of film position sensors 56 for providing an appropriate signal to CPU 14 for advising when filmstrip 28 is present in that location.

In the embodiment illustrated in FIGS. 4, 5, 6, and 7, the filmstrip 28 is simply scrolled within each of the chambers 26,32. In this embodiment, a user would simply place a filmstrip into chamber 26 for driving the filmstrip onto the scanner and into take-up chamber 32. However, if desired and as described below, the present invention may be designed for use with typical film cartridges currently available on the market.

Figure 9:
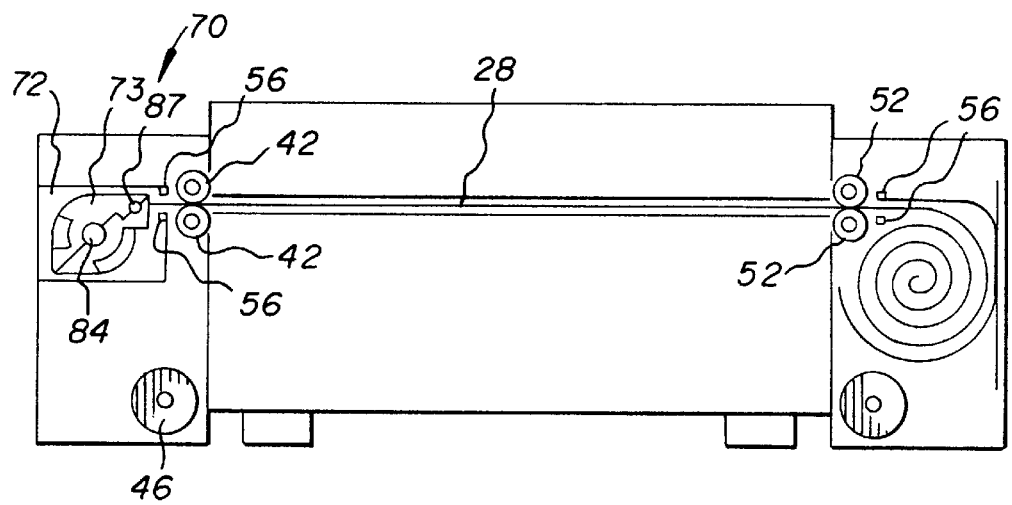
FIG. 9 is a view similar to FIG. 6 illustrating a modified automatic film feeder adapter made in accordance with the present invention designed for use with a thrust-type film cartridge.
Figure 8:
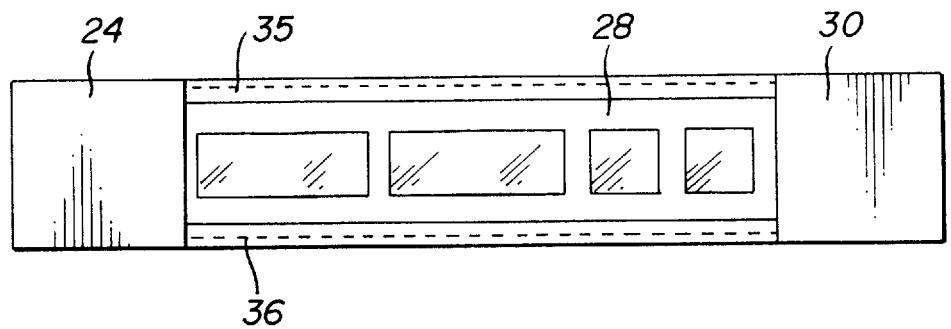
FIG. 8 is a top plan view of FIG. 7.

Referring to FIG. 9, there is illustrated a view similar to FIG. 6 illustrating a modified automatic film transport adapter 70 made in accordance with the present invention. The automatic film transport adapter 70 is similar to automatic film transport 22, like numerals indicating like parts and operation. In this embodiment, the film supply housing 24 is provided with a chamber 72 designed to receive a film cartridge 73 of the thrust-type such as described in U.S. Pat. Nos. 4,933,780 and 5,016,030. Briefly, the film cartridge 73 comprises a housing having a spool 84 rotatably mounted to the sides of the housing. A strip of photographic film 75 is spirally wound about the spool 84. The cartridge 73 further includes a light-locked door (not shown) that is rotatably moved between an open position and closed position by rotation of one of the ends 87 of the door that extends through the one side of the cartridge 73. The film can either be thrust out of the cartridge 73, or back into the cartridge by rotation of the spool 84 in the appropriate direction.

Both the scanner 12 and the automatic film transport adapter 22 are operationally connected to and controlled by computer 14. Computer 14 provides the appropriate instructions to each of the devices so that they operate together at the appropriate time and sequence.

An optional magnetic reader 78 may be provided for reading information that may have been recorded on the filmstrip 28, if it is of the type having a magnetic layer. This information may be useful in deterring the frame positioning, image format, and any other information written on the magnetic layer and utilized by the computer. For example, but not by way of limitation, this additional information could include time stamp data, exposure data, customer ID, and print selection.

Figure 10:
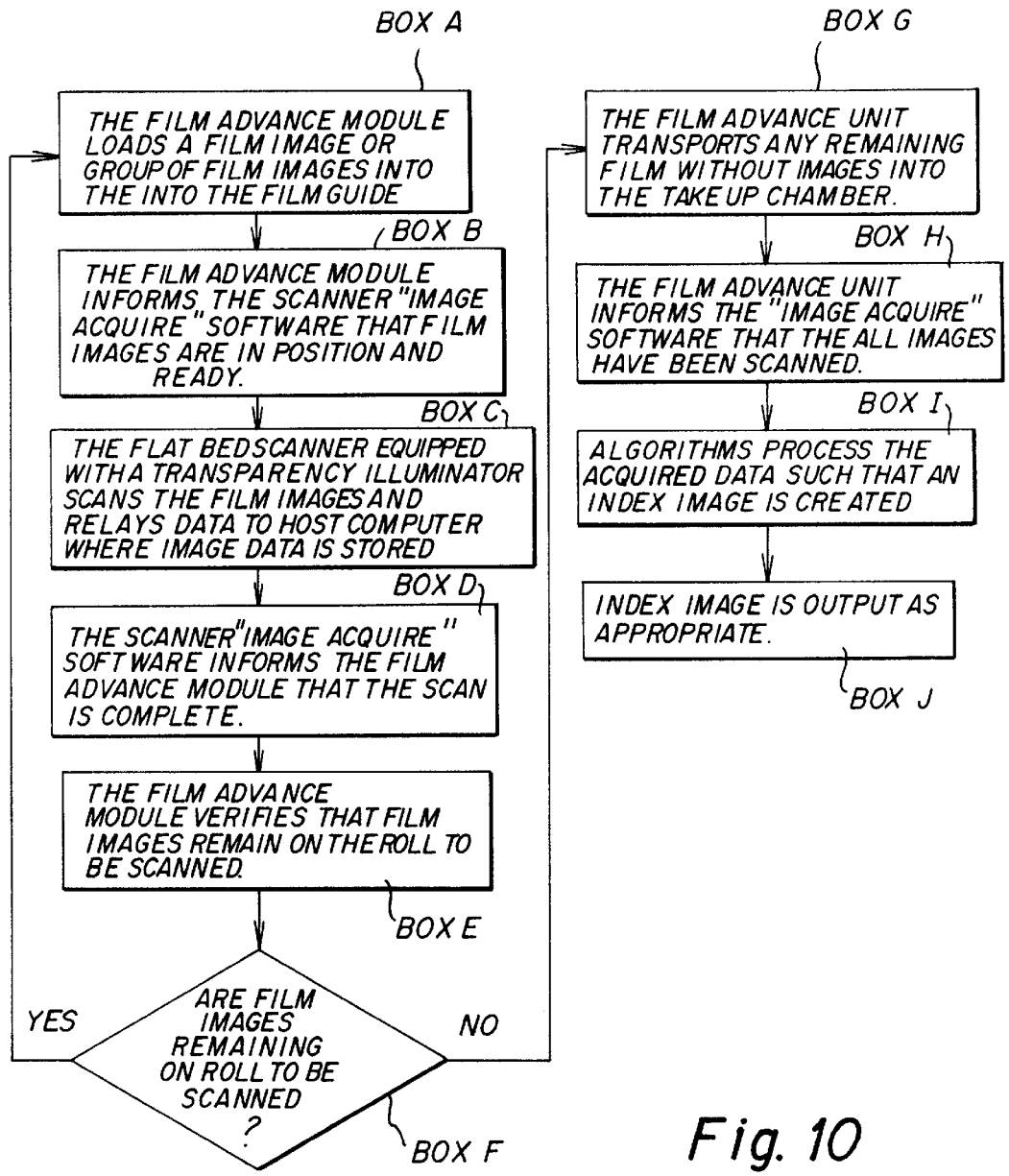
FIG. 10 is a flow chart of the operation of the present invention.

In order to more clearly understand the present invention, a brief description of its operation will now be discussed. Referring to FIG. 10, there is illustrated a block diagram illustrating the operation of the automatic film transport adapter and scanner 12.

First, an appropriate filmstrip is placed within chamber 26. Appropriate motors are activated by computer 14 so as to cause the filmstrip 28 to move a predetermined amount out of the opening through the tracks 35,36 of guide assembly 34 (Box A). A sufficient amount of the filmstrip is initially driven out such that the end of the filmstrip stops before reaching the film take-up housing 30. Once this has been done, the film supply advance system informs (Box B) the computer 14, which then activates the digital scanner 12 causing the images 29 to be scanned by the scanner 12 (Box C). The computer is programmed such that scanning takes place wherein only the area of platen 20 containing the filmstrip 28 is scanned, thus, minimizing any waste of time in the scanner scanning the entire platen 20. Once this information is passed onto the CPU (Box D), it is maintained there for appropriate manipulation. Appropriate software is used to identify individual image areas and remove those areas around the images that are not desired to be printed. Additionally, the software can be used to read film type and frame codes that are placed on the edges of the filmstrip. Any commercially available software may be used to read this information obtained from the film scanning. Software capable of image editing is sold by the Eastman Kodak Company under the Kodak Composite Machine trademark. However, any appropriate software may be utilized in identifying and separating the images. Once the images have been captured and stored, the appropriate signal is passed back to the automatic film transport adapter 22 to obtain additional images from the film (Box E) whereby appropriate activation of motors cause an additional predetermined amount of filmstrip 28 to be advanced such that the film area that had been previously scanned is forwarded into the chamber 32 of the take-up housing and a new portion of the film containing additional images is placed on the platen 20 for scanning. Once the appropriate predetermined amount of film has been paid out and the film is motionless, the appropriate signals are sent to the CPU where the scanner is again activated for scanning so as to capture and store the images on the filmstrip 28. This procedure is repeated until the filmstrip 28 has been completely scanned whereby all of the images will have been captured by the scanner at which time appropriate motors 46,54 are reversed returning the filmstrip back (see Boxes F, G, H, I and J). Alternatively, film which is not attached to a film cartridge or magazine can be left in take-up chamber 30.

The embodiment illustrated in FIG. 9 is operated in a similar manner as previously described, except in this embodiment, motor 46 is connected to the spool 84 for thrusting out of the filmstrip 28 from the cartridge, or returning the filmstrip back into the cartridge as required. An additional motor (or other means, not shown) is required for opening and closing of the door as appropriate for either allowing film to be returned back or thrust out of the cartridge 73. Sensors 56 are used for determining when filmstrip 28 is not present within the film path, thus allowing the film and cartridge to be easily removed from the supply housing.

Figure 11:
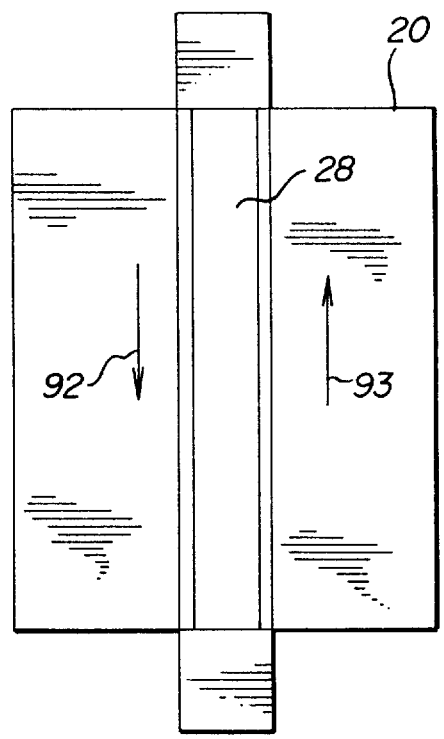
FIG. 11 is a top plan view of an alternate embodiment of the scanner and adapter assembly.

In the embodiment previously described, scanning of the filmstrip 28 is provided by moving various components in the scanner. The present invention provides a way wherein the scanning elements in the scanner 12 need not move. In an alternate embodiment illustrated in FIG. 11, there is provided an adapter 22 which is placed on the scanner 12 such that the filmstrip 28 moves in a direction (as indicated by arrow 92) which is opposite to the direction (as indicated by arrow 93) in which the scanning elements of scanner 12 normally scans. The filmstrip 28 would be moved at a predetermined speed equal to the scanning speed of the scanner 12. The computer 14 would be able to control the advancement of the filmstrip 28 and the scanning operation of the scanner. In this way, the entire filmstrip 28 can be scanned continuously without stopping of the filmstrip on the platen 20 for repositioning of the next segment of the filmstrip 28 on platen 20 for scanning. This embodiment not only decreases the scanning time, it also reduces wear on the moving components of the scanner 12. In this type scanner, the scanner must be capable of scanning without moving the light sensitive element (sensor).

It is to be understood that the various changes and modifications may be made without departing from the scope of the present invention. The present invention being limited by the claims that follow.

Parts List

10 . . . digital page scanning system
12 . . . scanner
14 . . . computer
16 . . . light source
18 . . . cover
19 . . . base
20 . . . platen
22 . . . film transport adapter
24 . . . supply housing
26 . . . chamber
28 . . . photographic film
29 . . . images
30 . . . take-up housing
32 . . . internal chamber
34 . . . guide assembly
35,36 . . . parallel tracks
38,40 . . . sides
42,44 . . . drive pinch rollers
46 . . . motor
50,52 . . . drive pinch rollers
54 . . . motor
56 . . . sensors
70 . . . film transport adapter
72 . . . chamber
73 . . . film cartridge
75 . . . photographic film
78 . . . magnetic reader
84 . . . spool
87 . . . ends
90 . . . sensors
92,93 . . . arrows

We claim:

1. A system for scanning images contained on a strip of film, comprising: a) a film cartridge having a spool rotatably mounted therein, a filmstrip spirally wrapped about the spool so that said filmstrip can be thrust out or thrust back into said cartridge by rotation of sad spool; b) a scanner having a platen designed to receive a discrete item for scanning and digitizing the information scanned; c) a transport mechanism comprising a housing for retaining the cartridge and a guide for guiding said filmstrip onto said platen for scanning, said guide comprising a pair of parallel tracks which guide the filmstrip across the platen while maintaining the filmstrip flat against said platen; d) a drive mechanism for advancing of the filmstrip out of said cartridge onto said platen for scanning; and e) said scanner having means for scanning said filmstrip and for digitizing the information contained therein; wherein said housing for retaining said thrust cartridge and said guide for guiding of the filmstrip are removably mounted to said scanner.

2. A system according to claim 1 wherein said guide for guiding the filmstrip on said platen includes a pair of spaced film transport tracks for guiding the edges of said filmstrip.

3. A system according to claim 1 wherein said housing for retaining a thrust cartridge further includes means for sensing and determining the position of the filmstrip.

4. A system according to claim 3 wherein said drive mechanism for advancing the filmstrip out of said cartridge comprises a pair of pinch rollers.

5. A system according to claim 1 wherein said scanner includes means for providing information as to the operational status of said scanner and said housing for retaining a thrust cartridge for guiding of the filmstrip.

6. A system according to claim 5 wherein said system further includes means for controlling the operation of said scanner and said housing.

7. A system according to claim 6 wherein said means for controlling the operation of said scanner comprises a computer which is in communication connection with said scanner so as to obtain information and for controlling operation of the scanner.

8. A method of automatically scanning a filmstrip, said filmstrip having at least one image thereon, utilizing a scanner having a platen designed for scanning of a discrete item and providing a digital output representative of at least one image so scanned, comprising the steps of: a) providing a mechanism which includes a housing for retaining the filmstrip and a guide which comprises a pair of parallel tracks which guides the film strip across the platen and maintains the filmstrip flat against the platen as the filmstrip moves across the platen; b) moving a predetermined amount of said filmstrip out of said cartridge onto said platen; c) scanning said predetermined amount of said filmstrip; d)

advancing an additional predetermined amount of said filmstrip out of said cartridge onto said platen; e) scanning said additional predetermined amount of filmstrip and f) repeating steps d) and e) until the entire filmstrip has been scanned so as to obtain a digital record of all the images thereon; wherein said mechanism is removably mounted to said scanner.

9. A method according to claim 8 wherein only a portion of the platen containing the filmstrip is scanned.

10. A method according to claim 8 wherein said filmstrip is continuously moved across said platen at a predetermined rate while the scanner scans said images thereon in accordance with the rate said film is being moved on said platen.

11. A method of automatically scanning a filmstrip, said filmstrip having at least one image thereon, utilizing a scanner having a platen designed for scanning of a discrete item and providing a digital output representative of at least one image so scanned, comprising the steps of: a) providing a mechanism for retaining a filmstrip and for moving the filmstrip across said platen, said mechanism comprising a pair of parallel tracks which guide the filmstrip, such that said filmstrip is maintained flat against the platen; b) moving said filmstrip continuously across said platen; and c) scanning said filmstrip as it moves across said platen so as to obtain a digital record of all the images thereon; wherein said mechanism for retaining a filmstrip and for moving the filmstrip across said platen comprises a removable adapter for use with said scanner.

12. A system for scanning image contained on a strip of film, comprising: a) a film cartridge having a spool rotatably mounted therein, a filmstrip spirally wrapped about the spool; b) a scanner having a platen designed to receive a discrete item for scanning and digitizing the information scanned; c) a transport mechanism comprising a housing for retaining the cartridge and a guide for guiding said filmstrip onto said platen for scanning, said guide comprising a pair of parallel tracks which guide the filmstrip across the platen while maintaining the filmstrip flat against the platen as the filmstrip is moved across said platen; d) a drive mechanism for advancing of the filmstrip out of said cartridge onto said platen for scanning; and e) said scanner having means for scanning said filmstrip and for digitizing the information contained therein; wherein said housing for retaining said filmstrip and said guide for guiding of the filmstrip are removably mounted to said scanner.

13. A system according to claim 12 wherein said guide for guiding the filmstrip on said platen includes a pair of spaced film transport tracks for guiding the edges of said filmstrip.

14. A system according to claim 12 wherein said housing further includes means for sensing and determining the position of the filmstrip.

15. A system according to claim 14 wherein said drive mechanism for advancing the filmstrip out of said cartridge comprises a pair of pinch rollers.

16. A system according to claim 12 wherein said scanner includes means for providing information as to the operational status of said scanner and said housing for guiding of the filmstrip.

17. A system according to claim 16 wherein said system further includes means for controlling the operation of said scanner and said housing.

18. A system according to claim 17 wherein said means for controlling the operation of said scanner comprises a computer which is in communication connection with said scanner so as to obtain information and for controlling operation of the scanner.

19. A method of automatically scanning a filmstrip, said filmstrip having at least one image thereon utilizing a scanner having a platen designed for scanning of a discrete item and providing a digital output representative of at least one image so scanned, the method comprising the steps of: a) providing a removable adapter for retaining a film cartridge having a filmstrip, said adapter having means for moving the filmstrip from said cartridge and across said platen, such that the filmstrip is maintained flat against the paten as the filmstrip moves across said platen, said adapter comprising a pair of parallel tracks which guide the film stripe; b) moving said filmstrip continuously across said platen; and scanning said filmstrip as it moves across said platen so as to obtain a digital record of all the images thereon.

20. The method according to claim 19 wherein said film cartridge is a thrust film cartridge having a spool around which said filmstrip is wound and connected, said filmstrip being initially removed from said cartridge by rotating said spool.

* * * * *